March 2, 1926.
C. A. ROWLEY
1,575,006
DRAWING AND FLATTENING TABLE FOR SHEET GLASS
Filed Jan. 25, 1924    2 Sheets-Sheet 1
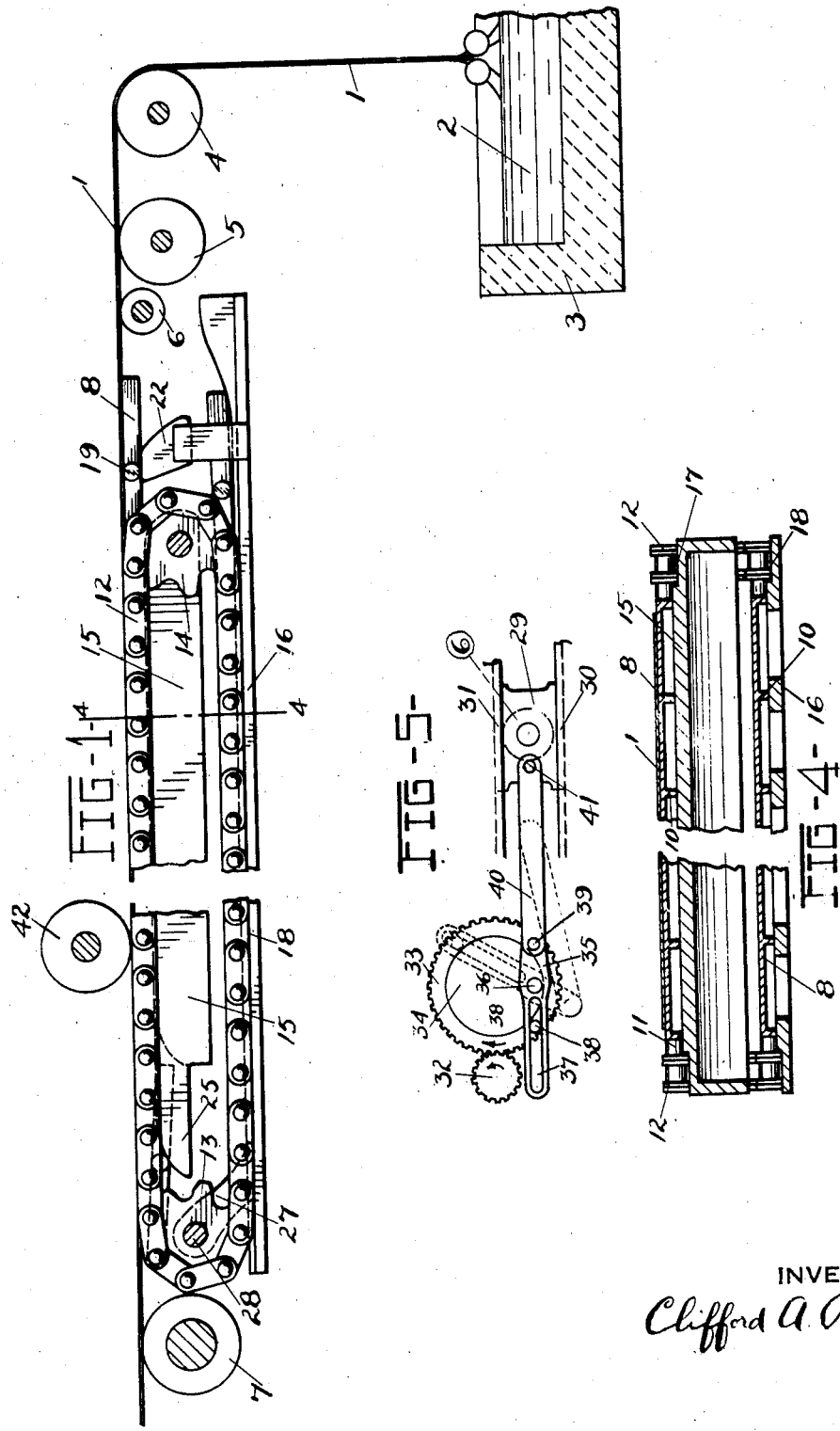
INVENTOR
Clifford A. Rowley March 2, 1926.                C. A. ROWLEY                1,575,006
              DRAWING AND FLATTENING TABLE FOR SHEET GLASS
                   Filed Jan. 25, 1924        2 Sheets-Sheet 2
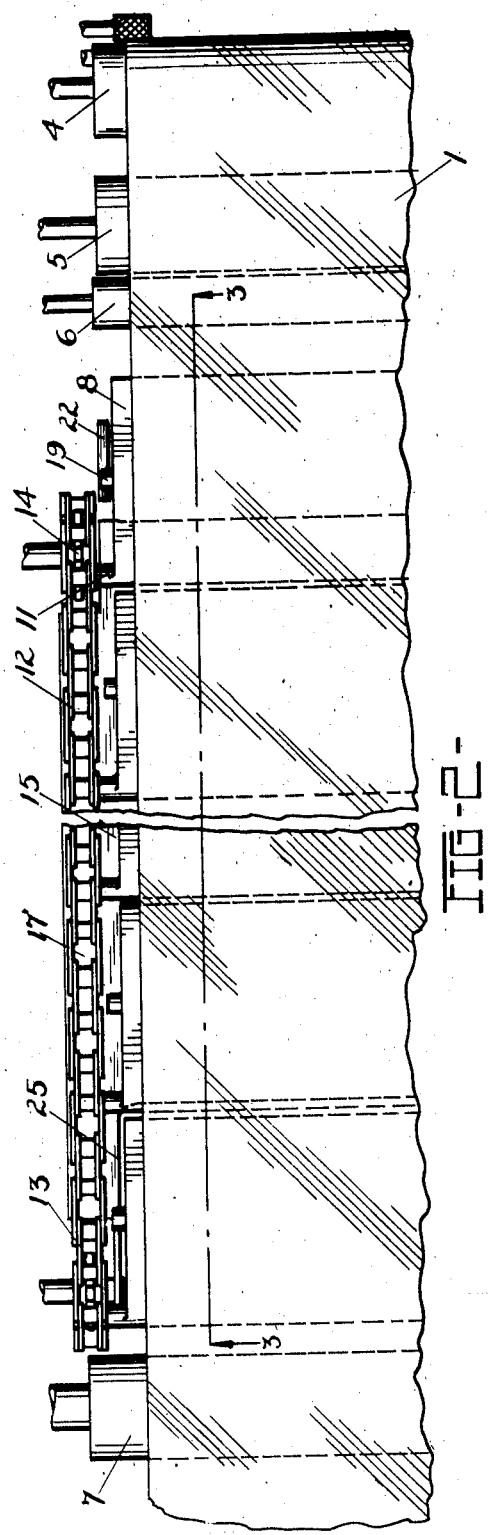
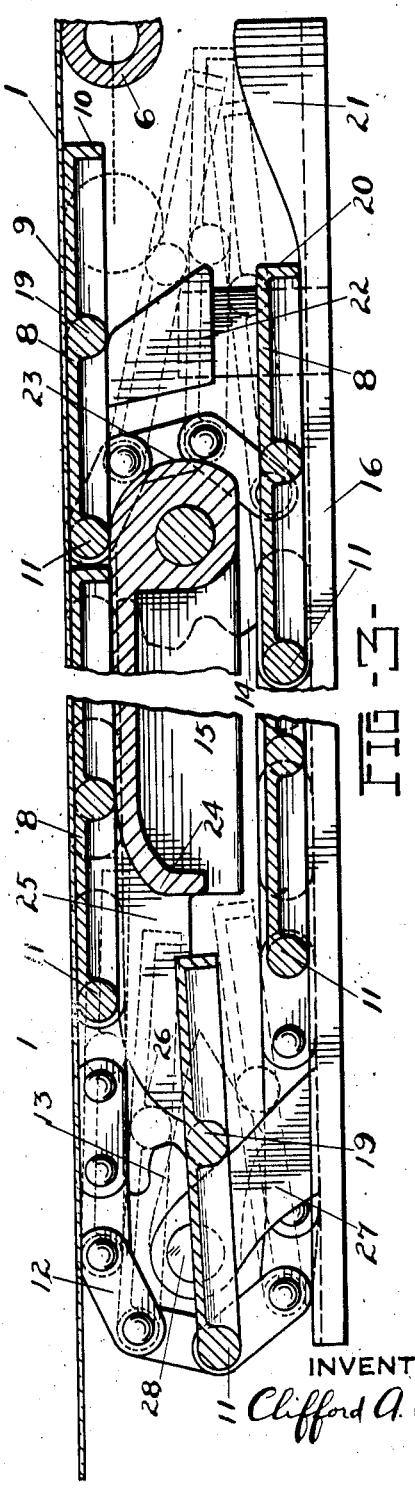
INVENTOR
Clifford A. Rowley

Patented Mar. 2, 1926.

1,575,006

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

DRAWING AND FLATTENING TABLE FOR SHEET GLASS.

Application filed January 25, 1924. Serial No. 688,357.

*To all whom it may concern:*

Be it known that I, CLIFFORD A. ROWLEY, a citizen of the United States, residing at Toledo, in the county of Lucas and State of Ohio, have invented new and useful Improvements in Drawing and Flattening Tables for Sheet Glass, of which the following is a specification.

This invention relates to improvements in the art of drawing sheet glass, and more particularly to an improved form of drawing and flattening table for the glass sheet.

In the patent to Colburn, 1,248,809, granted December 4, 1917, is disclosed a process and apparatus for drawing a sheet of glass upwardly from a pool of molten glass, bending the sheet while still plastic about a cooled bending roller, and then carrying the sheet horizontally over a traveling drawing and flattening table and thence into the leer. The present invention relates to a new and improved form of drawing and flattening table especially adapted for use in such a sheet-drawing system.

This improved table comprises a series of flat sheet-supporting plates or slabs, of a length greater than the width of the sheet. The width of the slabs may be varied without departing from the principles of this invention, and for example may be made wide enough to flatten a sheet of glass sufficiently large for an automobile windshield, upon a single unit or slab of the flattening table. These slabs are carried in a continuous series, with the sheet supported thereon, forwardly in one horizontal plane, and are then returned in a closely adjacent parallel plane therebeneath, without reversing the slabs or turning them upside down. In other words, the smooth sheet-supporting surface of each slab remains uppermost at all times. The slabs are drawn along in both directions by a pair of looped sprocket chains, one at either side of the path of travel of the table, and the slabs are individually raised from their lower return idle run to their upper forward sheet-carrying run, and lowered from the upper run to the lower run at the end of their forward travel, by a series of cam members which will be described in detail hereinafter.

This new table has the advantage of embodying very large single sheet-supporting unit surfaces, and at the same time having a very small over-all depth to the table. In a copending application filed of even date herewith, a system is disclosed for drawing a plurality of sheets of glass in a single one of these machines. Such a system requires a drawing and flattening table that may be used in the small vertical distance between two parallel horizontal sheets. The table forming the subject-matter of the present invention is especially adapted for such a use, although it may be used with equal advantage in a machine adapted for drawing a single sheet of glass.

Other objects and advantages of the invention will be more clearly understood from the following detailed description of one approved form of the apparatus.

In the accompanying drawings:

Fig. 1 is a side elevation, partly in section, of the flattening table and adjacent portions of the sheet-drawing mechanism. The central portion of the table is broken away.

Fig. 2 is a plan view of one side portion of the apparatus disclosed in Fig. 1.

Fig. 3 is a longitudinal vertical section on an enlarged scale, taken substantially on the line 3—3 of Fig. 2.

Fig. 4 is a transverse vertical section taken substantially on the line 4—4 of Fig. 1.

Fig. 5 is a side elevation of a quick-return mechanism that may be used with one of the intermediate sheet-supporting rollers as hereinafter described.

The glass sheet 1 is drawn upwardly from the pool of molten glass 2 in receptacle 3, and then bent about the bending roller 4 and into the horizontal plane. After passing over suitable intermediate supporting rollers such as 5 and 6, the still somewhat plastic sheet passes onto the drawing and flattening table forming the subject-matter of the present invention. On this table the sheet settles and cools, and leaves the table and passes over certain rollers such as 7 into the leer as a flat stiff sheet of glass.

The sheet-supporting portion of the table is comprised of a series of similar rectangular supporting slabs 8. Each of these slabs has a flat upper sheet-supporting surface 9, and is preferably formed with a series of cross-ribs or projections 10 on its lower surface for increasing the strength and rigidity of the slab without unduly increasing its weight. Preferably, the slab will be made of some suitable alloy such as Monel-metal or nichrome, capable of taking and retaining a high polish on its upper flat surface. However, the slab might be made of iron or other metal, and provided with an upper sheet-supporting surface of a suitable alloy, or glass, or other substance capable of supporting the plastic glass sheet 1 without injuring the delicate fire-polished surface thereof. The upper surfaces of the slabs never contact with anything except the glass sheet so that no injuries to these polished surfaces should normally occur.

At its forward edge, each slab is provided with an outwardly extending stud or stub-shaft 11, which forms one of the pintles of an endless driving sprocket chain 12, there being one of these chains 12 at each side of the table. Chains 12 are looped about, and driven by, suitable sprockets 13 and 14 adjacent the two ends of the table.

During their upper sheet-carrying run, the slabs 8 are drawn along the flat upper surface of a stationary supporting table 15. During their return idle run the slabs slide along a lower horizontal supporting table 16. During their upper forward run the chains 12 slide along supporting trackways 17 at the sides of table 15, and during their lower return runs these chains slide along trackways 18 at the sides of table 16. About midway of each end, each slab is provided with an outwardly extending stud or pin 19 adapted to cooperate with certain cam members hereinafter described for raising and lowering the slabs at the ends of their paths of travel.

The means whereby the slabs are individually and successively elevated from their lower return run to their upper forward sheet-carrying run will now be described, referring more particularly to Fig. 3 of the drawings. As one of the slabs 8 nears the end of its rearward travel (to the right in Fig. 3), its rear edge 20 will ride up the cam member 21, formed at the rear end of table 16. This position of the slab is indicated in dotted lines in Fig. 3. As this rear edge 20 reaches the highest part of cam 21, the forward edge of the slab connected by pintles 11 with the sprocket chains 12, will pass up around the end loops of the chains. As this forward edge of the slab is elevated by the chains passing around the sprocket wheels 14, the studs 19 on the ends of the will be slab will be drawn back into contact with stationary cams 22, and as the slab begins its forward travel these studs will ride up the cams 22 until the slab is brought up evenly beneath the horizontal glass sheet 1, as shown in Fig. 3. At the right-hand end of this figure, one slab has just reached this sheet-supporting position, and the next following slab is still resting upon the lower table 16, but its free end 20 is just ready to begin to slide up the cam surface 21. Intermediate positions of the slab as it is elevated from its lower to its upper position are indicated in dotted lines.

The rear end of supporting table 15 may be rounded, as indicated at 23, to provide an additional cam surface acting against the forward edge 11 of the slab to assist in this elevating process.

After one of the slabs reaches its upper sheet-carrying position, it is drawn forwardly along the flat upper surface of supporting table 15 carrying the glass sheet 1 therewith. It will be understood that the table is much longer than as shown in Fig. 3, the central portion of the table being cut away in this view in order to show both ends of the table on an enlarged scale.

At its forward end the central portion of the stationary supporting table 15 terminates at a distance from the forward downward loop of the sprocket chains 12 somewhat greater than the width of the slabs 8. This forward end of table 15 is preferably rounded downwardly as shown at 24. The forward side edges of table 15 are provided with extensions 25 which terminate at a distance from the downward loops of chains 12 substantially equal to the distance between the pintles 11 and studs 19 on the slabs. These extensions 25 are adapted to support the studs 19 and hence the slabs 8, as the slabs run off from the forward end of the supporting table 15. As the forward edges of the slabs are lowered by the chain passing downwardly around sprockets 13, the studs 19 first run down the rounded cam surfaces 26 at the forward ends of extensions 25. As the studs 19 run off from these cams 26 they drop onto the rearwardly sloping surfaces of cams 27 pivotally mounted on the ends of the shafts or journals 28 which support and drive the sprockets 13. As the pintles 11 round the ends of the down loops of the sprocket chains and the slab 8 begins to move rearwardly, the studs 19 simultaneously ride down the surfaces of cams 27 until the slab is lowered into position on the lower supporting table 16. The cams 27 will support the rear edge 20 of one slab out of engagement with the forward edge of the slab 8 in advance thereof until pintles 11 have reached the lower portion of their run, and the slab 8 may be swung down onto table 16 without contacting with the next adjacent slab. As the slab 8 slides rearwardly along the table 16, the cams 27 will swing upwardly about their pivots 28, as shown in dotted lines, to allow the passages of the pintles thereunder.

It will be noted that the slabs 8 may be made of any reasonable width providing the cams and supporting members are properly proportioned. However, if these slabs 8 are of considerable width, the length of unsupported plastic glass sheet between the supporting roller 5 and the rear edge of the flattening table will vary through wide limits, depending on whether a slab 8 has just been raised into sheet-supporting position, or has moved forwardly until the succeeding slab is about to be raised up to follow it. To meet this contingency, the intermediate supporting roller 6 is made movable so that it will follow the slab 8 last raised into sheet-supporting position, at approximately half the speed of the slab, so as to remain midway of the length of glass sheet between roller 5 and slab 8 to give the maximum support thereto. Just before the following slab 8 is raised into sheet-supporting position, it is necessary that this intermediate roll 6 be quickly returned to its original position.

A suitable quick-return movement for performing this function is illustrated in Fig. 5 of the drawings. In this figure, 29 indicates one of the journal-boxes supporting an end of roll 6. This journal-box is slidable longitudinally between trackways 30 and 31. At 32 is shown a constantly driven gear meshing with an annular gear 33 moving about a large fixed disc 34. A lever 35 is intermediately pivoted at 36 on the disc 34. One arm of lever 35 has an elongated slot 37 in which moves a stud 38 secured to annular gear 33. The opposite shorter end of lever 35 is pivoted at 39 to a link or connecting rod 40, which is pivoted at its other end 41 to a portion of sliding journal-box 29. It will be seen that as the annular gear 33 revolves in the direction of the arrow, the stud 38 will move outwardly in slot 37, rotating lever 35 about its pivot 36, and slowly drawing the journal-box 29 to the left. This will continue throughout about three-quarters of the rotation of gear 33. For the other one-quarter of the revolution of gear 33, the slotted end of lever 35 will be swung back through the lower half of its orbit, and through link connection 40 return the box 29 to its original position. In other words, with the mechanism proportioned as here shown, the box 29 will be returned to the right in one-third of the time it takes to draw it to the left. It is to be understood that this form of quick-return mechanism is not original, and is merely illustrative of one form of mechanism adapted for this purpose. If the slabs 8 are made comparatively narrow it will be unnecessary to move the intermediate supporting roll 6, and this quick-return mechanism may be omitted.

Any suitable means, such as rollers 42, resting on the edge portions of the glass sheet 1 above the flattening table, may be used to increase the frictional contact of the sheet with the table to prevent slippage thereon. These rollers may be driven if desired, or looped chains of draw-bars adapted to rest on the sheet may be used, as disclosed in the Colburn patent, referred to hereinabove. When the continuous sheet is once under way through the machine and leer, the weight of the sheet itself will usually be sufficient to provide the necessary frictional drawing engagement with the table.

Claims:

1. A drawing and flattening table for sheet glass, comprising an upper stationary table and a lower stationary table, the tables each having upper flat horizontal supporting surfaces, a series of flat sheet-supporting plates, and means for moving the plates successively along the upper table beneath and with the glass sheet, and then returning them along the lower table, the sheet-supporting surfaces of the plates always remaining uppermost, and out of contact with the tables.

2. A drawing and flattening table for sheet glass, comprising an upper stationary table and a lower stationary table, the tables each having upper flat horizontal supporting surfaces, a series of flat sheet-supporting plates, sprocket chains for drawing the plates along the upper table with and beneath the glass sheet, and then returning them along the lower table, and a series of cams for lowering and raising the plates at the ends of their upper and lower runs, the sheet-supporting surfaces of the plates always remaining uppermost.

3. A drawing and flattening table for sheet glass, comprising an upper stationary table and a lower stationary table, the tables each having upper flat horizontal supporting surfaces, a series of flat sheet-supporting plates, a pair of chain loops one at each side of the tables, each plate being hinged to the chains at its forward edge so that the chains will draw the plates along the upper table and then return them along the lower table, and cam means adapted to cooperate with the chains to lower and raise the plates at the ends of their upper and lower runs, the sheet-supporting surfaces of the plates always remaining uppermost and never contacting with the tables.

4. In a sheet glass drawing apparatus, a source of molten glass, means for drawing a sheet of glass therefrom comprising a series of flat sheet-supporting plates and means to move the plates beneath and with the sheet, supporting rollers beneath that portion of the sheet between the source and the moving plates, and means for shifting one of the rollers toward and from the plates as the plates are successively brought up into sheet-supporting position.

5. In a sheet glass drawing apparatus, a source of molten glass, means for drawing a sheet of glass therefrom comprising a series of flat sheet-supporting plates and means to move the plates beneath and with the sheet, supporting rollers beneath that portion of the sheet between the source and the moving plates, and means for shifting one of the rollers slowly in the direction of movement of the plates and then returning it quickly to its initial position just before another plate is brought up beneath the sheet.

Signed at Toledo, in the county of Lucas and State of Ohio, this 23d day of January, 1924.

CLIFFORD A. ROWLEY.